United States Patent
Okazaki

(10) Patent No.: US 9,984,291 B2
(45) Date of Patent: May 29, 2018

(54) INFORMATION PROCESSING APPARATUS, INFORMATION PROCESSING METHOD, AND STORAGE MEDIUM FOR MEASURING A POSITION AND AN ORIENTATION OF AN OBJECT BY USING A MODEL INDICATING A SHAPE OF THE OBJECT

(71) Applicant: CANON KABUSHIKI KAISHA, Tokyo (JP)

(72) Inventor: Hiroshi Okazaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 15/077,783

(22) Filed: Mar. 22, 2016

(65) Prior Publication Data

US 2016/0283792 A1 Sep. 29, 2016

(30) Foreign Application Priority Data

Mar. 24, 2015 (JP) .................. 2015-061687

(51) Int. Cl.
*G06K 9/00* (2006.01)
*G06K 9/52* (2006.01)
(Continued)

(52) U.S. Cl.
CPC ........ *G06K 9/00664* (2013.01); *B25J 9/1612* (2013.01); *B25J 9/1697* (2013.01);
(Continued)

(58) Field of Classification Search
USPC ........ 198/400; 318/568.13, 568.16; 345/156, 345/419; 348/47, 94, 136; 382/103, 141,
(Continued)

(56) References Cited

U.S. PATENT DOCUMENTS 5,446,835 A * 8/1995 Iida ................. B25J 9/1687
700/259
6,597,971 B2 * 7/2003 Kanno ............... B25J 9/1666
318/568.13

(Continued)

FOREIGN PATENT DOCUMENTS

JP H05-127724 A 5/1993

*Primary Examiner* — Xuemei Chen
(74) *Attorney, Agent, or Firm* — Canon U.S.A., Inc. IP Division

(57) ABSTRACT

An information processing apparatus includes a distance information acquisition unit configured to acquire distance information with respect to a measurement target object to determine interference between the object and a container for storing the object when the object is to be gripped, a derivation unit configured to derive a position and an orientation of the measurement target object based on the distance information and a partial model representing a partial shape of the measurement target object, and an interference determination unit configured, based on the position and the orientation derived by the derivation unit and a whole model representing a whole shape of the measurement target object, to determine whether interference has occurred between the measurement target object and the container for storing the measurement target object.

13 Claims, 19 Drawing Sheets

(51) Int. Cl.
*B25J 9/16* (2006.01)
*G06T 7/73* (2017.01)

(52) U.S. Cl.
CPC .................. *G06K 9/52* (2013.01); *G06T 7/75* (2017.01); *G05B 2219/39543* (2013.01); *G06T 2207/10004* (2013.01); *G06T 2207/10028* (2013.01)

(58) Field of Classification Search
USPC ............... 382/152, 153; 700/216, 253, 259; 702/155; 703/1
See application file for complete search history.

(56) References Cited

U.S. PATENT DOCUMENTS

| | | | | |
|---|---|---|---|---|
| 6,721,444 B1* | 4/2004 | Gu | ............ | B25J 9/1697 345/419 |
| 7,084,900 B1* | 8/2006 | Watanabe | ............ | G06K 9/6203 348/94 |
| 7,657,346 B2* | 2/2010 | Ban | ............ | B25J 9/1697 318/568.16 |
| 7,663,630 B2* | 2/2010 | Kim | ............ | G06T 17/00 345/419 |
| 7,753,191 B2* | 7/2010 | Lykkegaard | ............ | B64F 1/32 198/400 |
| 7,957,580 B2* | 6/2011 | Ban | ............ | B25J 9/1697 382/141 |
| 7,996,114 B2* | 8/2011 | Ban | ............ | B25J 9/1697 382/153 |
| 8,098,928 B2* | 1/2012 | Ban | ............ | B25J 9/1697 382/152 |
| 8,295,975 B2* | 10/2012 | Arimatsu | ............ | B25J 9/1697 700/216 |
| 8,350,806 B2* | 1/2013 | Nagasaka | ............ | G06F 3/016 345/156 |
| 8,788,081 B2* | 7/2014 | Nagatsuka | ............ | G06F 17/5009 700/200 |
| 8,964,001 B2* | 2/2015 | Fujieda | ............ | G06T 7/0046 348/47 |
| 9,089,966 B2* | 7/2015 | Domae | ............ | B25J 9/1612 |
| 9,095,977 B2* | 8/2015 | Yamamoto | ............ | B25J 9/1664 |
| 9,104,193 B2* | 8/2015 | Atohira | ............ | G05B 19/4097 |
| 9,126,337 B2* | 9/2015 | Iwatake | ............ | B25J 9/1694 |
| 9,302,391 B2* | 4/2016 | Iio | ............ | B25J 9/1679 |
| 9,317,771 B2* | 4/2016 | Ejima | ............ | G06K 9/4633 |
| 9,352,939 B2* | 5/2016 | Suzuki | ............ | B66C 15/045 |
| 9,415,511 B2* | 8/2016 | Gotou | ............ | B25J 9/1612 |
| 9,573,273 B2* | 2/2017 | Takeda | ............ | B25J 9/1605 |
| 9,595,095 B2* | 3/2017 | Aiso | ............ | G06T 7/73 |
| 9,604,364 B2* | 3/2017 | Nishihara | ............ | B25J 9/1697 |
| 2002/0133319 A1* | 9/2002 | Tang | ............ | G05B 19/4097 703/1 |
| 2007/0293986 A1* | 12/2007 | Nagatsuka | ............ | B25J 9/1671 700/245 |
| 2007/0299642 A1* | 12/2007 | Kondo | ............ | G06F 17/5009 703/6 |
| 2013/0158947 A1* | 6/2013 | Suzuki | ............ | G01B 11/00 702/155 |
| 2014/0200863 A1* | 7/2014 | Kamat | ............ | G01C 15/00 703/1 |
| 2014/0225888 A1* | 8/2014 | Bell | ............ | G06T 17/00 345/419 |
| 2015/0276383 A1* | 10/2015 | Yoshikawa | ............ | G01B 11/14 348/136 |
| 2016/0039090 A1* | 2/2016 | Oyamada | ............ | B25J 9/163 700/253 |
| 2016/0221187 A1* | 8/2016 | Bradski | ............ | B25J 9/163 |
| 2016/0229061 A1* | 8/2016 | Takizawa | ............ | B25J 9/1694 |
| 2016/0332299 A1* | 11/2016 | Suzuki | ............ | G06K 9/00664 |
| 2016/0379370 A1* | 12/2016 | Nakazato | ............ | G06K 9/4604 382/103 |

\* cited by examiner

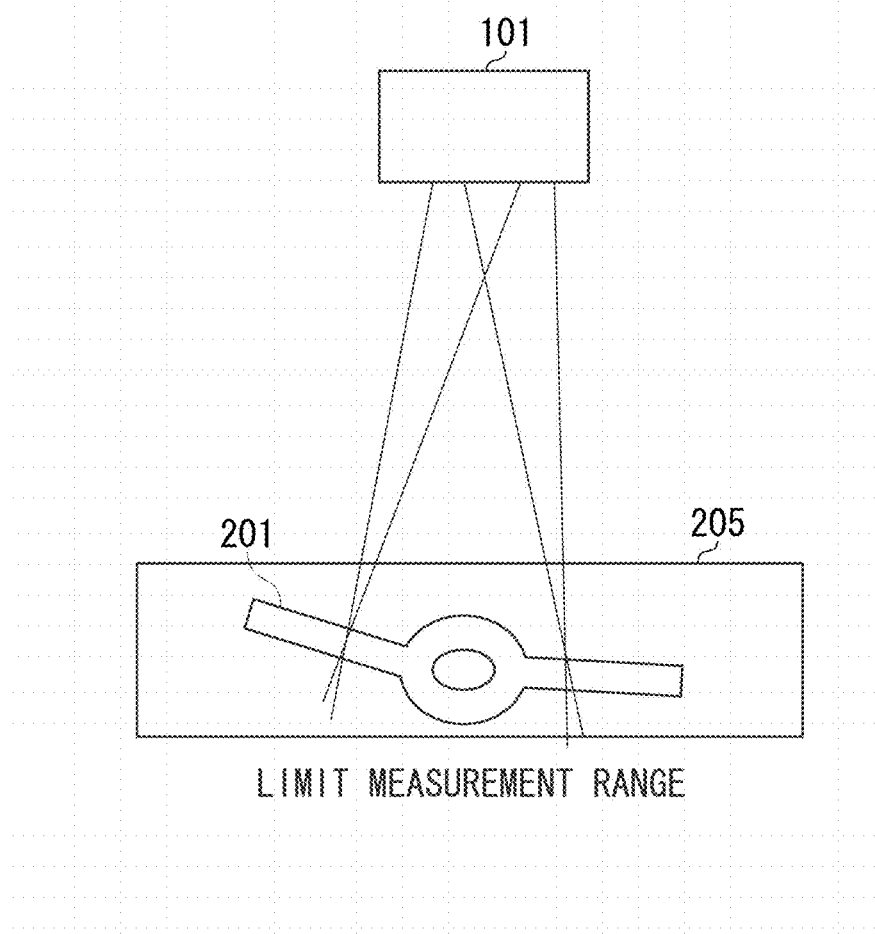

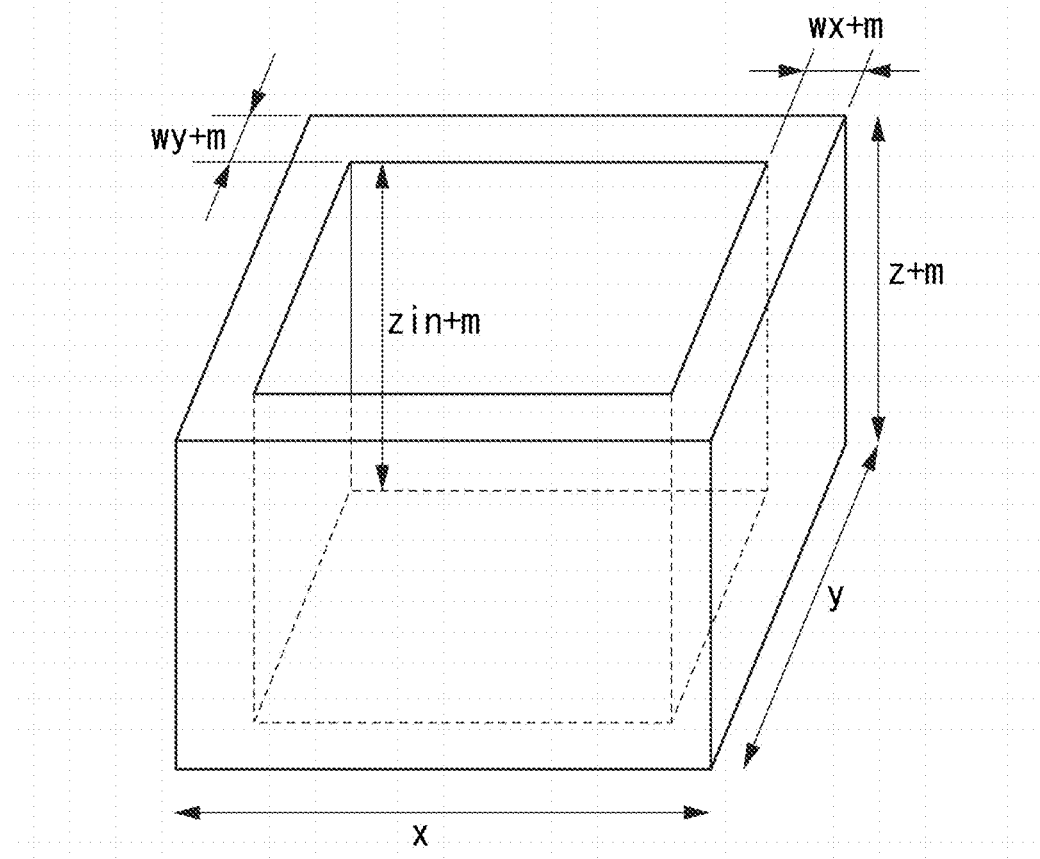

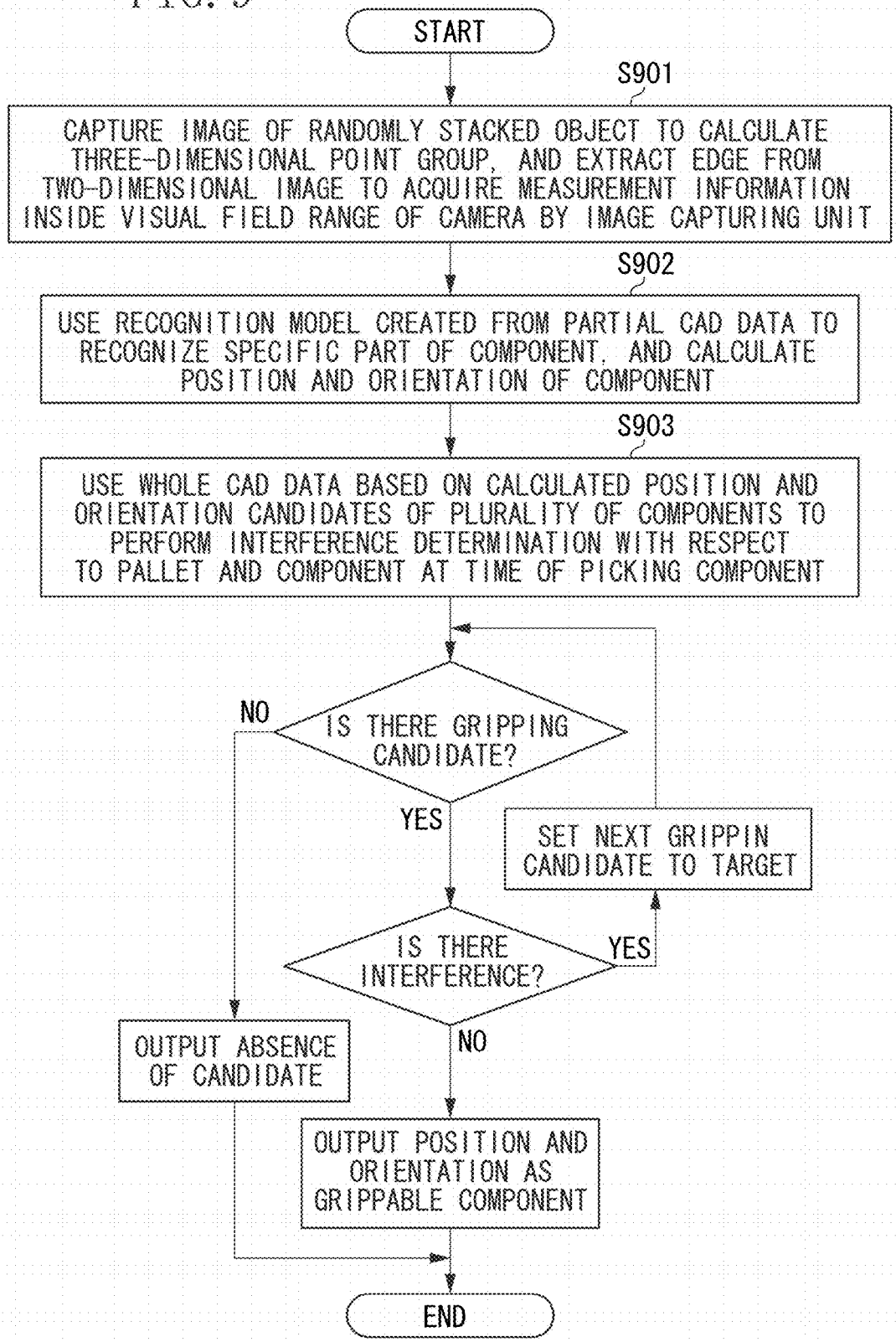

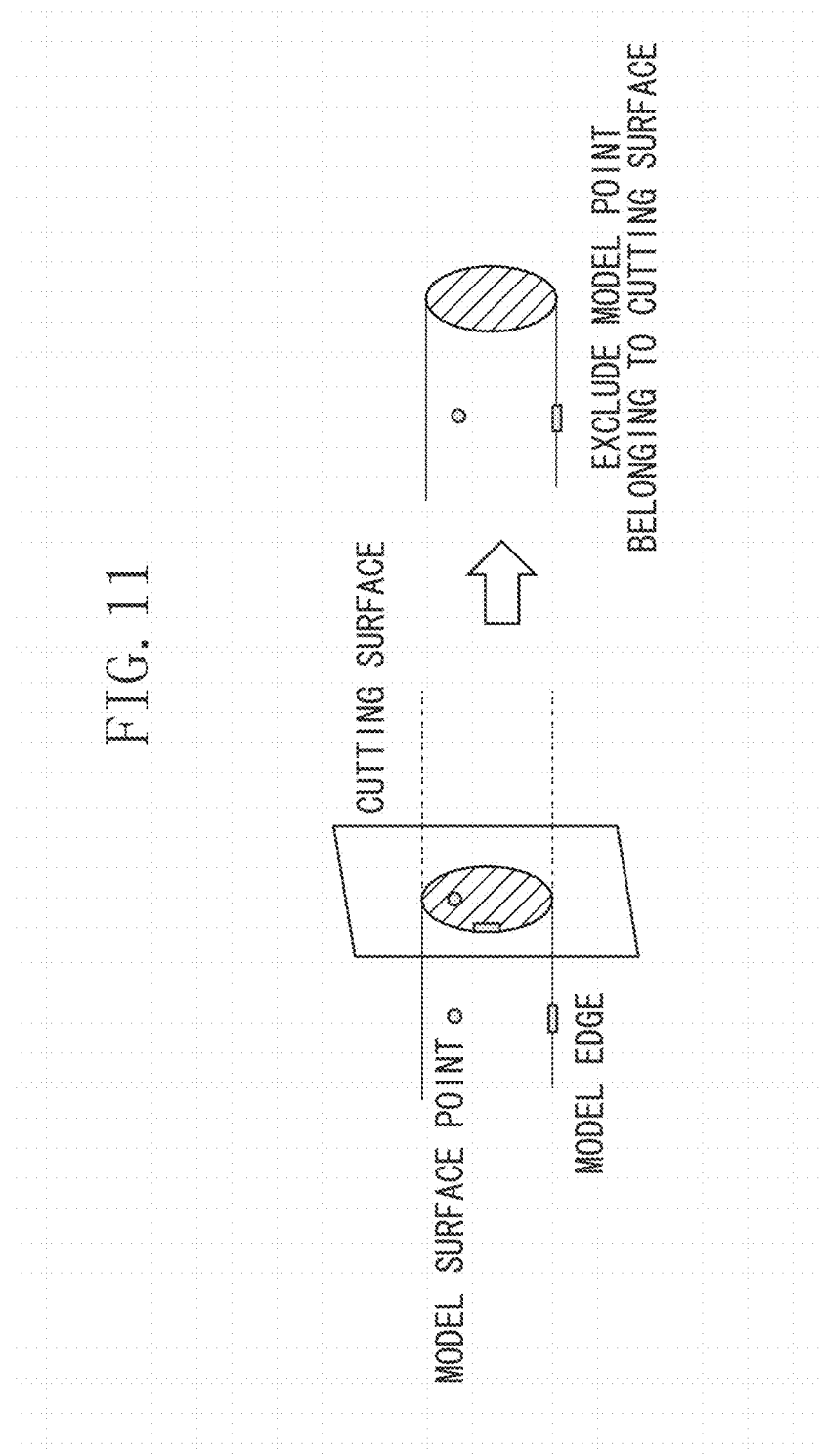

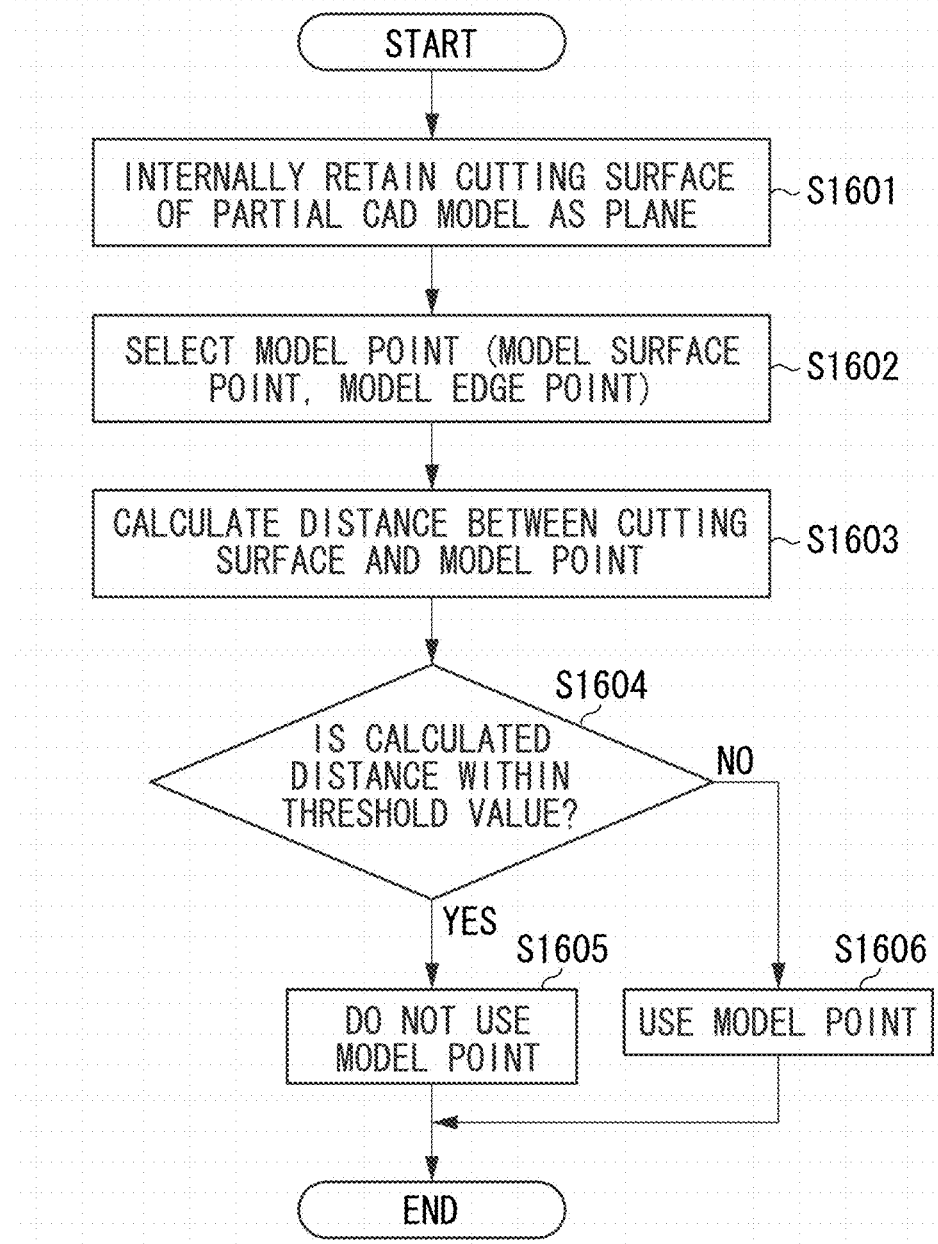

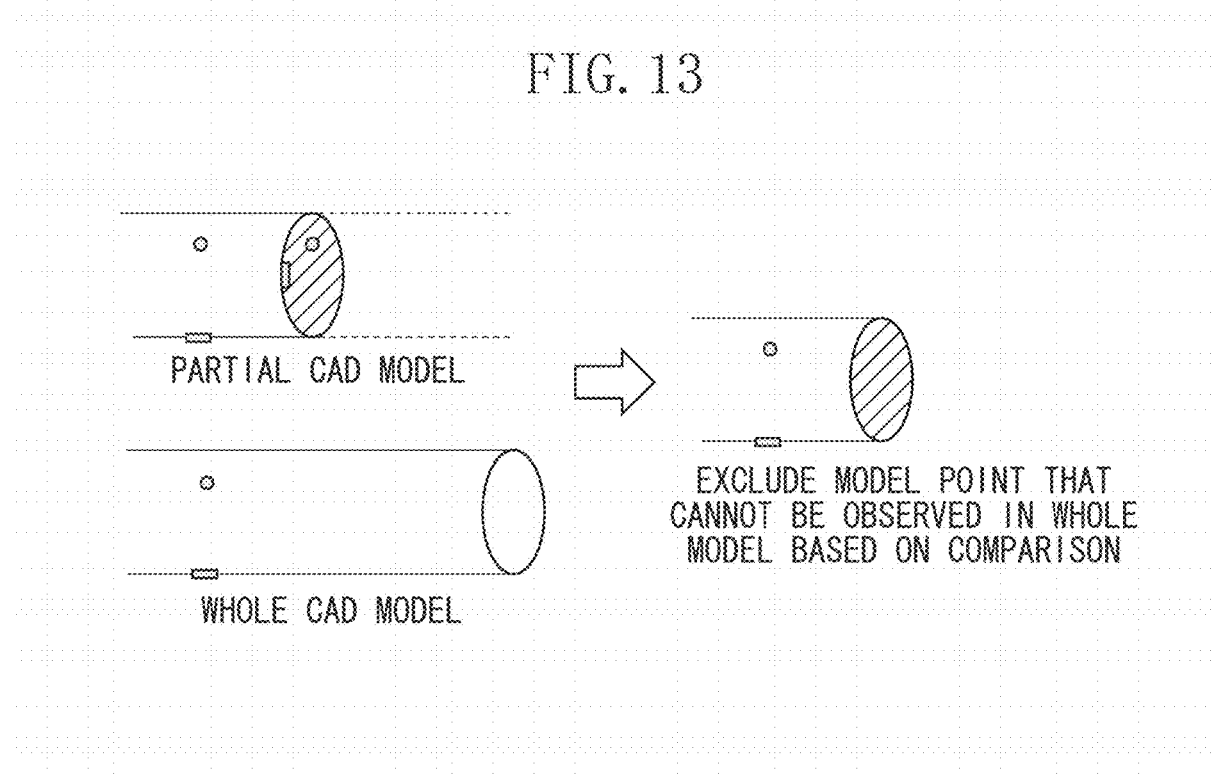

200
INFORMATION PROCESSING APPARATUS, INFORMATION PROCESSING METHOD, AND STORAGE MEDIUM FOR MEASURING A POSITION AND AN ORIENTATION OF AN OBJECT BY USING A MODEL INDICATING A SHAPE OF THE OBJECT

BACKGROUND OF THE INVENTION

Field of the Invention

The present invention relates to a technique for measuring a position and an orientation of an object by using a model indicating a shape of the object.

Description of the Related Art

Random bin-picking techniques have recently been developed to allow a hand mounted on a robot to grip one object among measurement target objects randomly stacked in a production line in a factory. Such techniques use a vision system to identify one object and measure a three-dimensional position and orientation of the object, so that the robot hand can grip the object. There is a method for calculating a position and an orientation of a measurement target object. According to the method, a recognition model for calculating the position and the orientation of the measurement target object is automatically generated using three-dimensional computer-aided design (CAD) data, to calculate the position and the orientation of the measurement target object. Then, the recognition model and measurement information acquired by distance measurement are subjected to fitting. According to this method, the vision system does not require to be customized for each measurement target object, and the vision system for each individual measurement target object can be provided by simply changing three-dimensional CAD data. Hence, this method is considered as effective.

Moreover, when the hand mounted on the robot grips an object, the presence of interference between a pallet and a measurement target object that may serve as a gripping candidate needs to be determined. Such interference determination is performed to check whether the measurement target object can be gripped before the measurement target object is determined as the gripping candidate. Even in such determination, geometric information of the measurement target object is necessary, and thus the three-dimensional CAD data is necessary.

A method discussed in Japanese Patent Application Laid-Open No. 5-127724 uses a contour edge line of a two-dimensional image to recognize a specific part within a measurement target object. In other words, the method discusses recognition of a portion instead of the measurement target object as a whole to calculate a position and an orientation of the measurement target object.

SUMMARY OF THE INVENTION

According to an aspect of the present invention, an information processing apparatus includes, for example, a distance information acquisition unit configured to acquire distance information with respect to a measurement target object, a derivation unit configured to derive a position and an orientation of the measurement target object based on the distance information and a partial model representing a partial shape of the measurement target object, an interference determination unit configured, based on the position and the orientation derived by the derivation unit and a whole model representing a whole shape of the object acquired from three-dimensional CAD data of the object, to determine whether interference has occurred between the measurement target object and a container for storing the measurement target object.

According to the present invention, it is possible to correctly determine interference between an object and a pallet even if a position and an orientation of the object are derived using a partial model.

Further features of the present invention will become apparent from the following description of exemplary embodiments with reference to the attached drawings.

BRIEF DESCRIPTION OF THE DRAWINGS

FIG. 4 is a diagram illustrating a case where a measurement range is limited.

FIG. 8 is a diagram illustrating margins used in the interference determination.

FIG. 9 is a flowchart illustrating a procedure for recognizing a measurement target object using a partial model and for determining interference using a whole model.

FIG. 11 is a diagram illustrating a case where a model point that belongs to a cutting surface and is not to be used is excluded according to the second exemplary embodiment.

FIG. 12 is a flowchart illustrating a procedure for excluding the model point in consideration of the cutting surface according to the second exemplary embodiment.

FIG. 13 is a diagram illustrating a case where a whole model and a partial model are compared to exclude a model point that is not to be used according to the second exemplary embodiment.

DESCRIPTION OF THE EMBODIMENTS

Hereinafter exemplary embodiments of the present invention are described in detail with reference to the drawings.

A first exemplary embodiment of the present invention is described. A hardware configuration of an information processing apparatus 1 common to each exemplary embodiment will be described first with reference to FIG. 17 prior to the disclosure of each exemplary embodiment of this patent specification.

Figure 17:
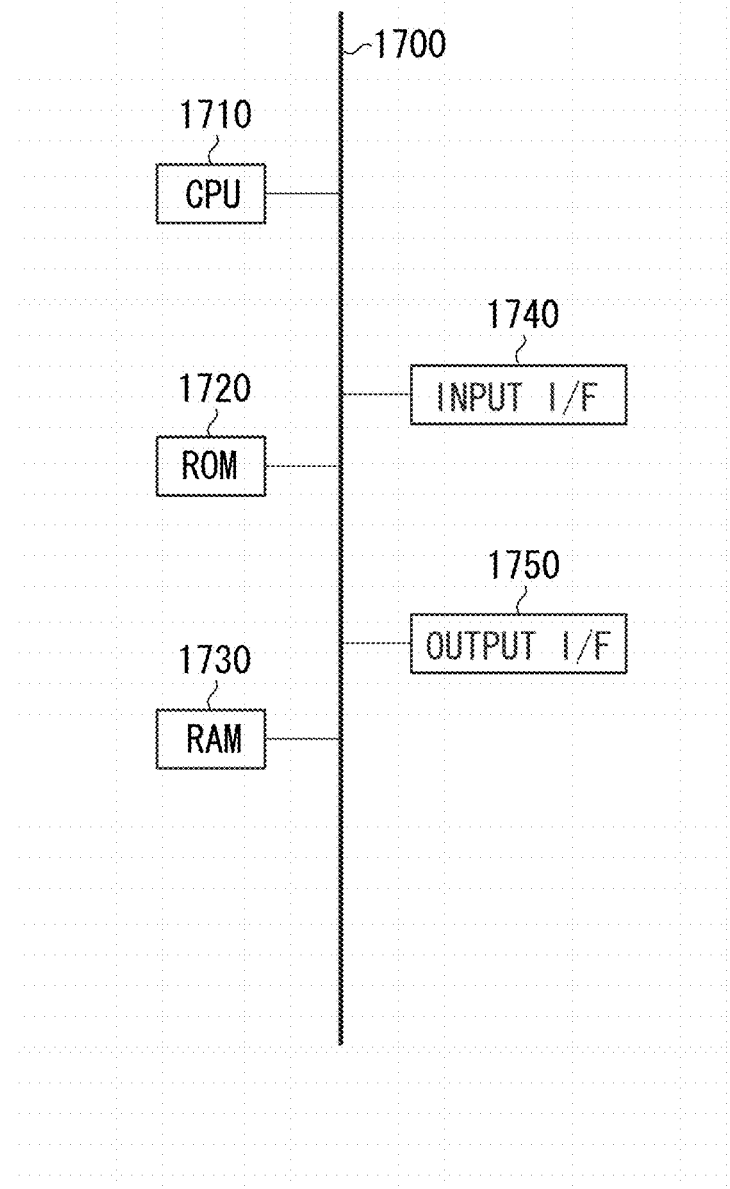
FIG. 17 is a diagram illustrating an example of a hardware configuration of an information processing apparatus according to an exemplary embodiment of the present invention.

FIG. 17 is a diagram illustrating the hardware configuration of the information processing apparatus 1 according to the present exemplary embodiment. In FIG. 17, a central processing unit (CPU) 1710 comprehensively controls devices connected with each other via a bus 1700. The CPU 1710 reads out a procedure and a program stored in a read only memory (ROM) 1720 to execute the procedure and the program. An operating system (OS), each processing program, and each device driver according to the present exemplary embodiment are stored in the ROM 1720. The OS, the processing program, and the device driver are temporarily stored in a random access memory (RAM) 1730 and executed by the CPU 1710 as necessary. An input interface (I/F) 1740 receives information from an external device (e.g., a display apparatus and an operation apparatus) as an input signal in a format that can be processed by the information processing apparatus 1. Moreover, an output interface I/F 1750 outputs information to the external device (the display apparatus) as an output signal in a format that can be processed by the display apparatus.

Figure 1:
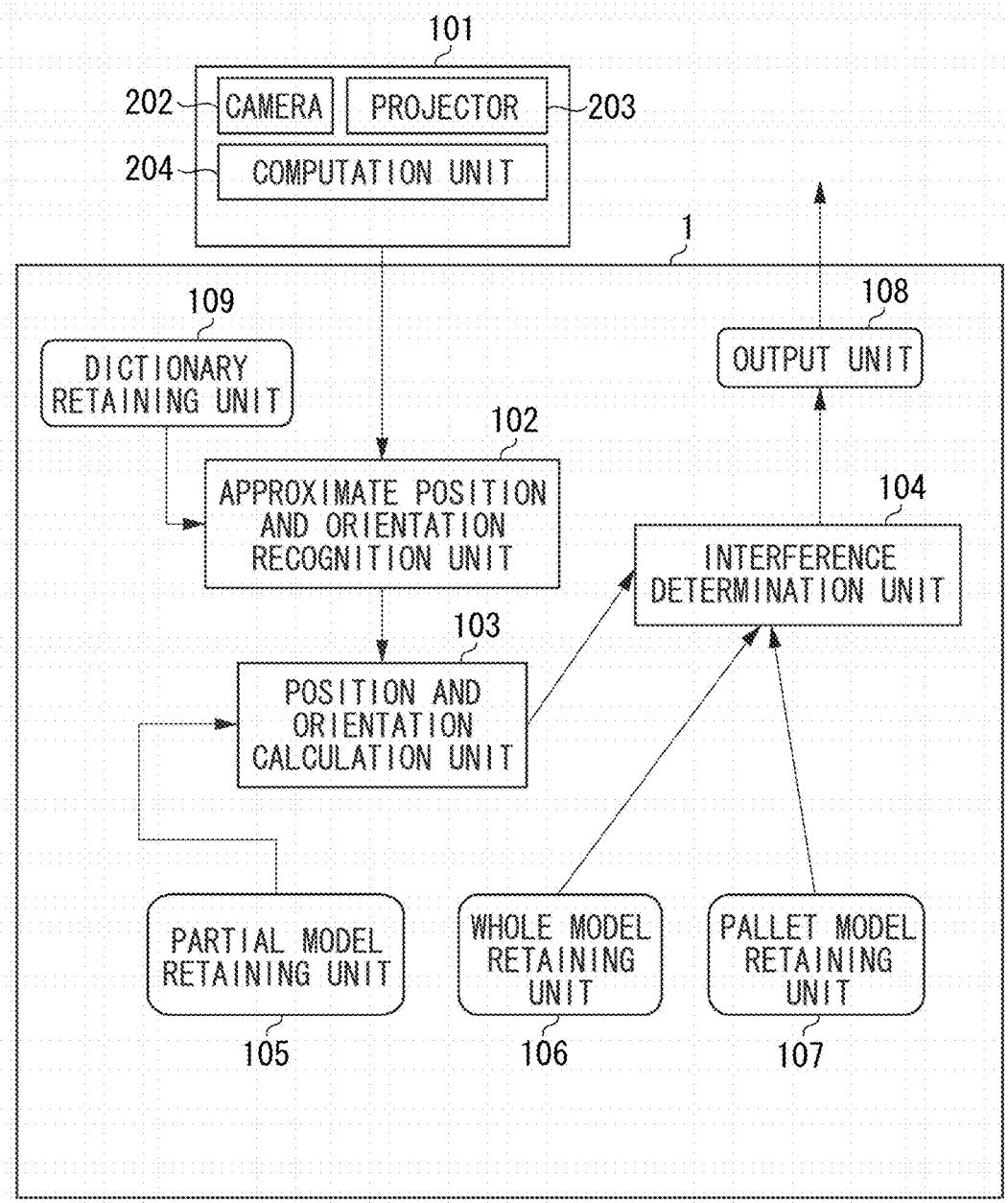
FIG. 1 is a diagram illustrating a configuration of a position and orientation measurement apparatus according to each of first through third exemplary embodiments of the present invention.

FIG. 1 is a functional block diagram illustrating a system using the information processing apparatus 1 according to the first exemplary embodiment. As illustrated in FIG. 1, the information processing apparatus 1 is connected to an external sensor unit 101.

The sensor unit 101 acquires measurement information needed for recognition of a position and an orientation of a measurement target object 201. In the present exemplary embodiment, the sensor unit 101 includes a camera 202, a projector 203, and a computation unit 204. The projector 203 irradiates the measurement target object 201 with a plurality of pattern rays, and the camera 202 acquires a pattern image including an object irradiated with the pattern rays. The sensor unit 101 calculates distance information of the measurement target object 201 based on the triangulation principle (distance information acquisition). However, the sensor unit 101 is not limited to a combination of a camera and a projector. For example, the sensor unit 101 may employ a method of causing a camera to capture reflection light of a laser beam or slit light emitted to a subject to measure distance based on the triangulation by using a computation unit, and a method based on a time-of-flight method that uses flight time of light. Alternatively, the sensor unit 101 may employ a method of causing a computation unit to calculate distance based on the triangulation from an image captured by a stereoscopic camera. Moreover, as long as information needed for recognition of a three-dimensional position and orientation of an object can be acquired, any sensor may be used.

Figure 2:
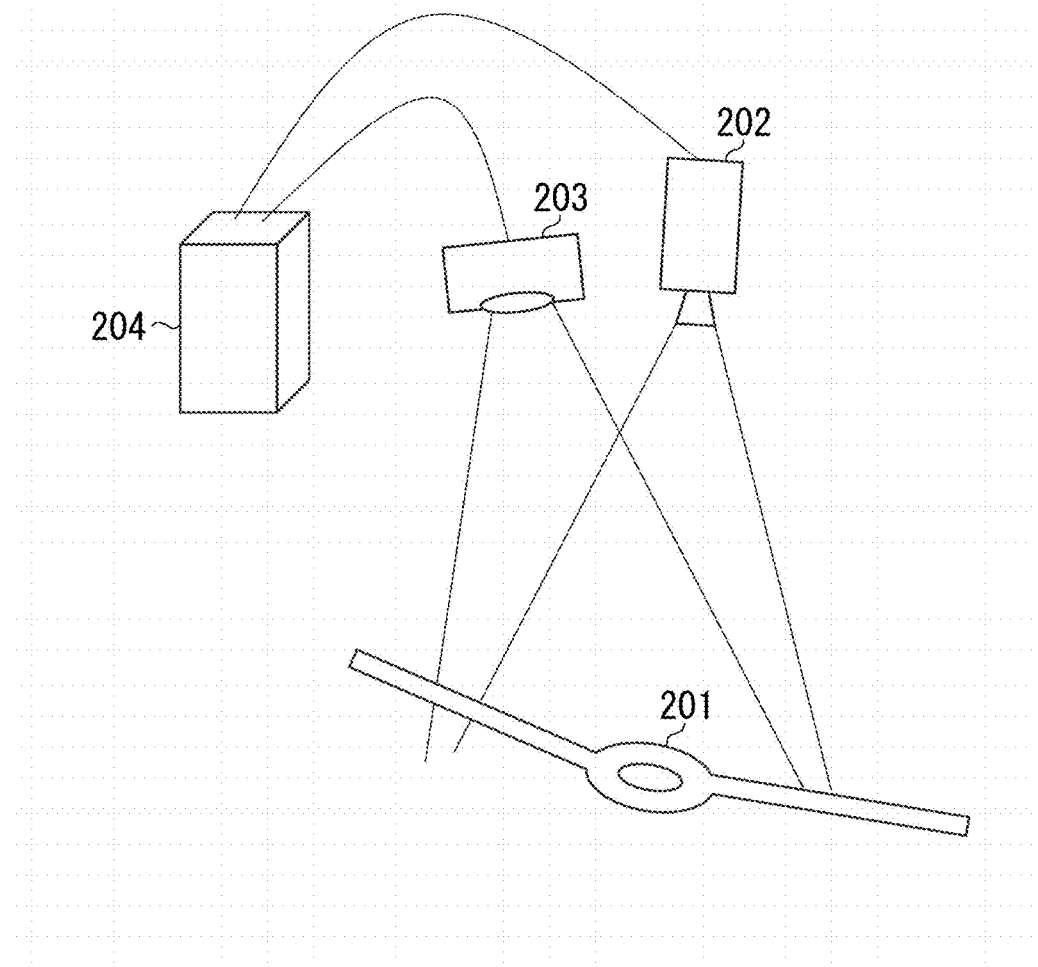
FIG. 2 is a diagram illustrating a typical sensor configuration of an exemplary embodiment.

FIG. 2 illustrates a typical configuration of the sensor unit 101 according to the present exemplary embodiment. The camera 202 captures an image of physical space. The camera 202 is used to capture an image of the measurement target object 201 to which light is emitted by the projector 203. The camera 202 transmits the captured image to a computation unit 204. The computation unit 204, based on the triangulation principle, calculates distance information from a plurality of images captured with different pattern rays. In the present exemplary embodiment, a sensor capable of acquiring a range image and a grayscale image is used. The measurement information (a range image and a grayscale image) acquired by the sensor unit 101 is input to an approximate position and orientation recognition unit 102. In the description below, an example of the measurement target object 201 includes an industrial component.

The approximate position and orientation recognition unit 102 detects one object from a plurality of measurement target objects 201 which are randomly stacked. Upon detection of the one object, the approximate position and orientation recognition unit 102 calculates an approximate value of position and an approximate value of orientation of the measurement target object 201 in a predetermined coordinate system. The approximate position and orientation recognition unit 102 acquires a recognition dictionary from a dictionary retaining unit 109, which will be described below, the recognition dictionary being created by prior learning. In the present exemplary embodiment, the recognition dictionary is created using a model (partial model) representing a partial shape of the measurement target object 201. The approximate position and orientation recognition unit 102 uses the recognition dictionary created by prior learning to determine which part of the measurement target object 201 has a shape similar to the partial model. Accordingly, the approximate position and orientation recognition unit 102 determines an approximate position and an approximate orientation.

A position and orientation calculation unit 103 calculates a position and an orientation of the measurement target object 201 using the approximate position and the approximate orientation recognized by the approximate position and orientation recognition unit 102, the measurement information acquired by the sensor unit 101, and a partial model. In the present exemplary embodiment, the partial model is the same as the model used when the dictionary used by the approximate position and orientation recognition unit 102 is created. The position and the orientation calculated by the position and orientation calculation unit 103 are more accurate than the approximate position and the approximate orientation determined by the approximate position and orientation recognition unit 102.

Figure 3A:
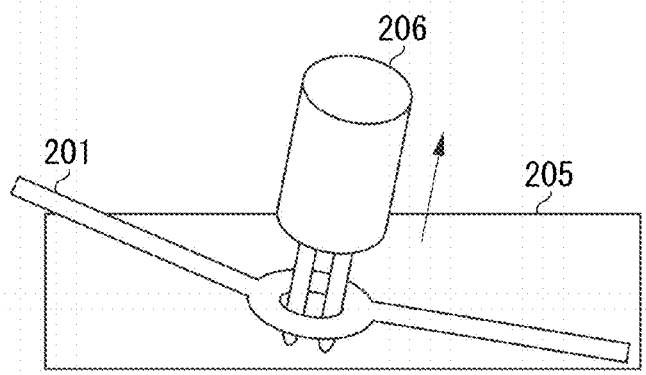
FIGS. 3A and 3B are schematic diagrams illustrating a concept of interference determination.
Figure 3B:
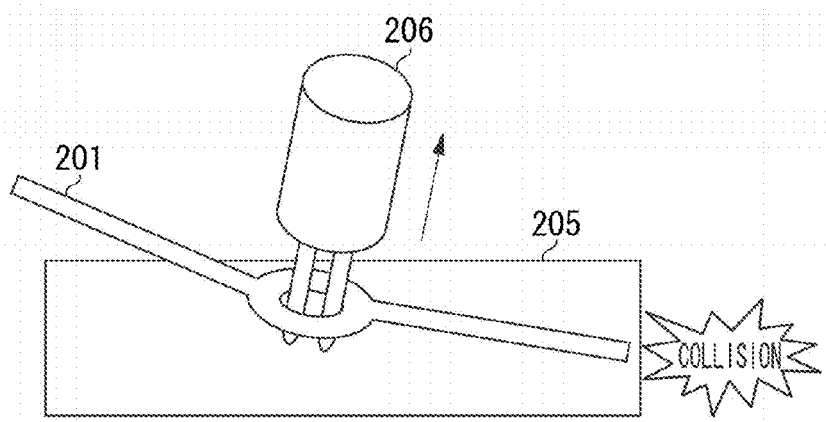

An interference determination unit 104 determines whether the measurement target object 201 and a pallet 205 collide when the measurement target object 201 is picked and extracted from the position and the orientation thereof calculated by the position and orientation calculation unit 103. FIGS. 3A and 3B are schematic diagrams illustrating a concept of such interference determination.

In the present exemplary embodiment, as illustrated in FIGS. 3A and 3B, if the whole area of the measurement target object 201 cannot be arranged inside a measurement range of the sensor unit 101, a specific part of the measurement target object 201 should be recognized by using the partial model. Even in such a case, however, interference between the measurement target object 201 and the pallet 205 needs to be determined using the whole model. Otherwise, the presence of interference is not determined in a case as illustrated in FIG. 3B. Accordingly, in the present exemplary embodiment, the recognition process is performed using a partial mode, whereas the interference determination process is performed using a whole model. Moreover, the recognition process may be performed using the partial model corresponding to a characteristic part as illustrated in FIG. 4. In such a case, the use of the partial model enables the recognition process to be performed more accurately with respect to the specific part than the use of the whole model.

The interference determination unit 104 performs interference determination at coordinate points where a robot hand 206 grips (holds) and slightly pulls up (holding operation) the measurement target object 201 in advance. The robot hand 206 is mounted on a robot arm. The robot hand 206 includes a multi-fingered gripping unit or an absorption unit. Particularly, polygon models representing a whole shape of the measurement target object 201 are first arranged in a space of reference coordinates. Then, planes corresponding to side surfaces of the pallet 205 are arranged. Subsequently, the interference determination unit 104 detects a three-dimensional space overlap or a layout relationship between each polygon and the plane, thereby performing the interference determination.

A whole model retaining unit 106 retains a model (whole model) representing the whole shape of the measurement target object 201, the whole shape being generated from a three-dimensional CAD model of the measurement target object 201. The whole model is used in an interference determination process by the interference determination unit 104.

A partial model retaining unit 105 retains a model (partial model) representing one part of the whole model, i.e., one part of a shape of the measurement target object 201. The retained partial model is used in a process performed by the position and orientation calculation unit 103. The partial model can be generated by cutting the whole model. Alternatively, the partial model can be generated from a three-dimensional CAD model, in other words, the partial model can be generated separately from the whole model.

Figure 5:
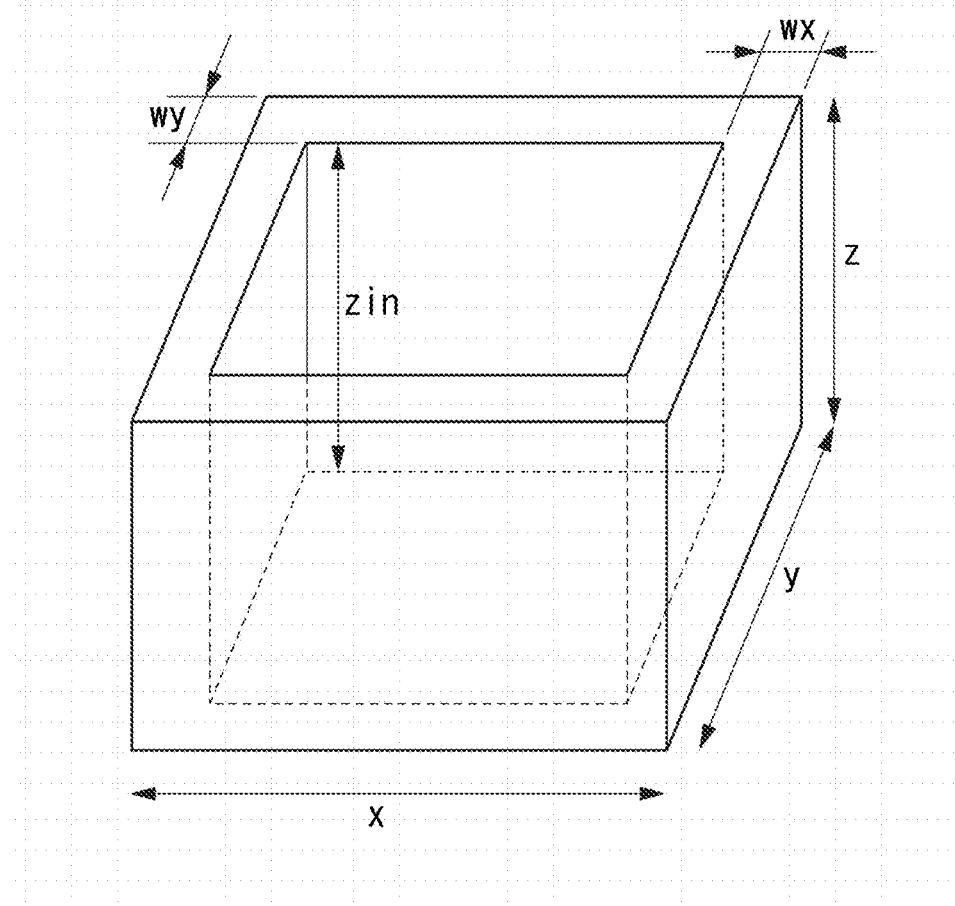
FIG. 5 is a diagram illustrating dimensions of a pallet to be input.

A pallet model retaining unit 107 retains a pallet model, i.e., a three-dimensional model representing a shape of the pallet 205 (container) for storing the measurement target object 201. The pallet model is used in an interference determination process by the interference determination unit 104. When each dimension of the pallet 205 is input, a shape model of the pallet 205 is generated as a pallet model. Particularly, as illustrated in FIG. 5, cubic dimensions x, y, and z of respective sides of the pallet 205, widths wx and wy of the pallet 205 in respective directions x and y, and an inner height zin of the pallet 205 are input. These input values are used to generate a shape model of the pallet 205. Moreover, a position and an orientation of the pallet 205 are determined using the generated shape model of the pallet 205. The position and the orientation of the pallet 205 may be defined such that the palette 205 is placed in substantially the same position that is determined beforehand, or depending on the approximate position and orientation recognition unit 102 and the position and orientation calculation unit 103. In other words, only the position and orientation calculation unit 103 is used for recognition of a position of the pallet 205, and the approximate position and orientation recognition unit 102 is not used. In a case where the pallet 205 is securely fixed, a position and an orientation of the pallet 205 can be considered as being known. In such a case, recognition of the position and the orientation of the pallet 205 is not necessary.

An output unit 108 outputs a result acquired by the interference determination unit 104 to an external device (e.g., a display) in a format that can be read by the external device.

The dictionary retaining unit 109 retains a dictionary to be used by the approximate position and orientation recognition unit 102. In the present exemplary embodiment, the dictionary retaining unit 109 retains a tree-structured dictionary. The tree-structured dictionary repeats classification of each node corresponding to a tree-structure node into any of lower nodes according to a predetermined rule with respect to a feature amount extracted from a learning image including an object having a known orientation. Such classification is performed in advance for each of a plurality of images, so that a result of classification of the learning images becomes a tree-structured dictionary. For example, if a feature amount includes a plurality of luminance values of an image, the luminance values are compared. Then, the feature amount is classified into a node according to the comparison result.

Each of functional units of the information processing apparatus 1 operates when the CPU 1710 loads a program stored in the ROM 1720 to the RAM 1730 and executes a process according to each of flowcharts which will be described below. Alternatively, for example, hardware may be used instead of the software process using the CPU 1710. In such a case, a computation unit or a circuit for a process of each of the functional units described in the present exemplary embodiment can be arranged.

FIG. 9 is a flowchart illustrating a procedure performed by the information processing apparatus 1 according to the present exemplary embodiment.

In step S901, the approximate position and orientation recognition unit 102 acquires measurement information of the measurement target object 201, the measurement information being acquired by the sensor unit 101.

In step S902, the approximate position and orientation recognition unit 102 and the position and orientation calculation unit 103 calculate a position and an orientation of the measurement target object 201 using the partial model.

First, the approximate position and orientation recognition unit 102 performs a recognition process using a recognition dictionary derived from the partial model.

The approximate position and orientation recognition unit 102 detects one object from a plurality of measurement target objects 201 which are randomly stacked, and calculates approximate values of a position and an orientation of the measurement target object 201. Assume that a three-dimensional coordinate system (a reference coordinate system) serving as a reference of position and orientation measurement is defined beforehand. In the present exemplary embodiment, a reference coordinate system includes an origin, an x-axis, a y-axis, and a z-axis. The origin represents a center of a sensor in the sensor unit 101. The x-axis and the y-axis respectively represent a horizontal direction and a vertical direction in an image to be acquired. The z-axis represents an optical axis of the sensor unit 101. A position and an orientation of an object indicate a position and an orientation of the object in the reference coordinate system. In the present exemplary embodiment, the dictionary created by prior learning described above is used, and an approximate position and an approximate orientation as a rough position and a rough orientation of the measurement target object 201 are recognized (the approximate position and orientation derivation) with respect to a range image and a grayscale image acquired by the sensor unit 101. In the recognition of the approximate position and the approximate orientation, a partial image obtained by dividing each of the acquired range image and the grayscale image is classified according to the rule used at prior learning, and an orientation of an object in the learning image corresponding to the classified node is set to be a recognized orientation. Subsequently, results of classification on respective partial images are accumulated to determine the position and the orientation. However, other methods for recognizing an approximate position and an approximate orientation may be used. For example, an image observed from a plurality of orientations can be used as a template to perform pattern matching. Alternatively, as long as one object can be found from a pile and a three-dimensional position and orientation of the object can be calculated, any methods other than the method described above may be used. The position and the orientation calculated by the approximate position and orientation recognition unit 102 are input to the position and orientation calculation unit 103 as an approximate position and an approximate orientation.

Subsequently, the position and orientation calculation unit 103 uses a conventional iterative closest point (ICP) algorithm to calculate (perform fitting) a position and an orientation of the measurement target object 201 based on the input approximate position and orientation such that the partial model of the measurement target object 201 and the measurement information acquired by the sensor unit 101 fit most. For example, only a range image or a grayscale image may be used to perform fitting. Particularly, a model point on the partial model is first projected on the range image based on the approximate position and the approximate orientation, and the model point is associated with the closest distance point (a measurement point). The approximate position and the approximate orientation are repeatedly updated such that a distance between the model point and the measurement point associated with each other is minimized. A position and an orientation of the measurement target object 201 are derived from the updating process.

In step S903, the interference determination unit 104 performs interference determination using the whole model.

The above-described procedure is performed by the information processing apparatus 1.

Figure 7:
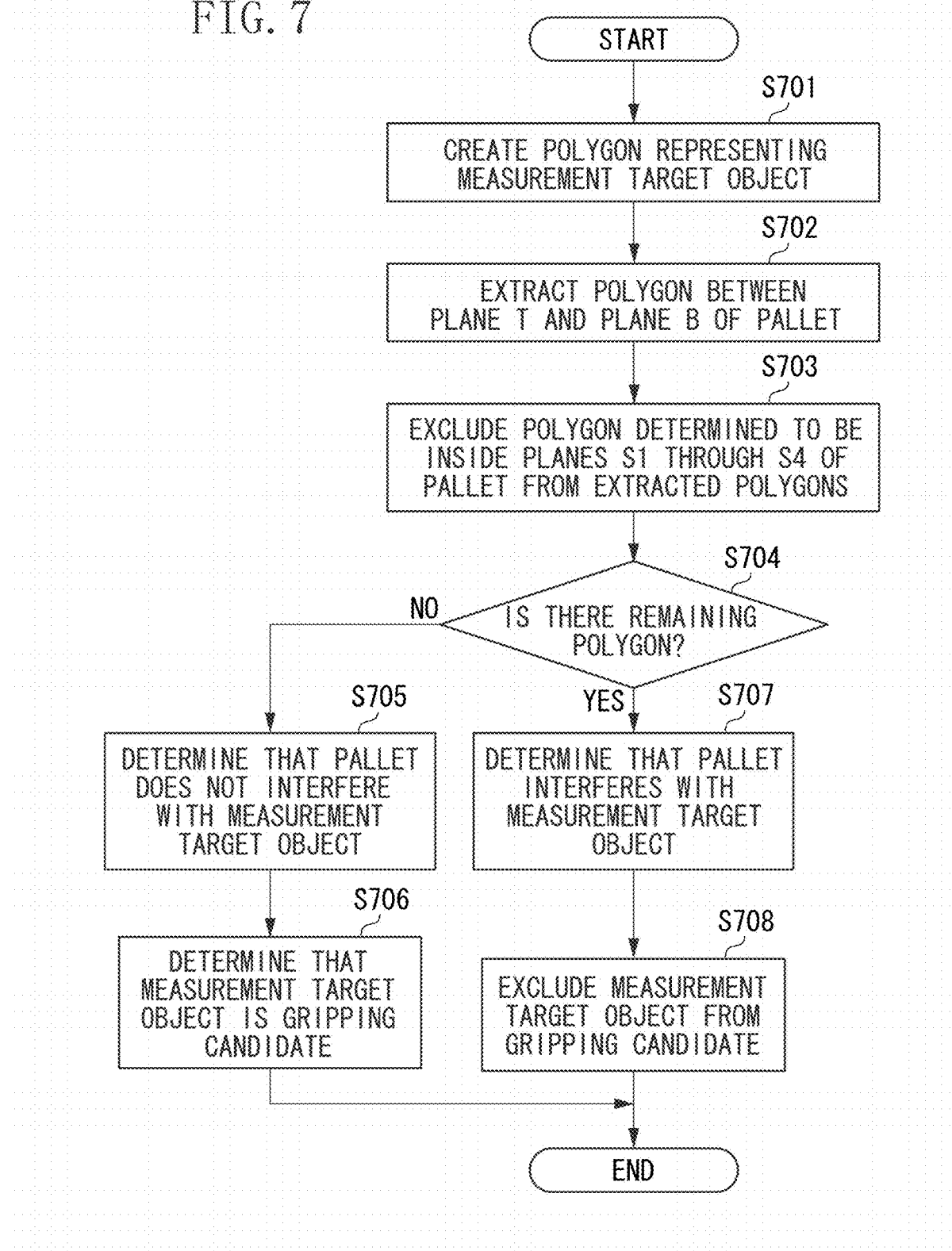
FIG. 7 is a flowchart illustrating an interference determination procedure for determining whether interference has occurred between a measurement target object and the pallet.

Next, the interference determination process in step S903 illustrated in FIG. 9 is described in detail with reference to FIG. 7.

Figure 6:
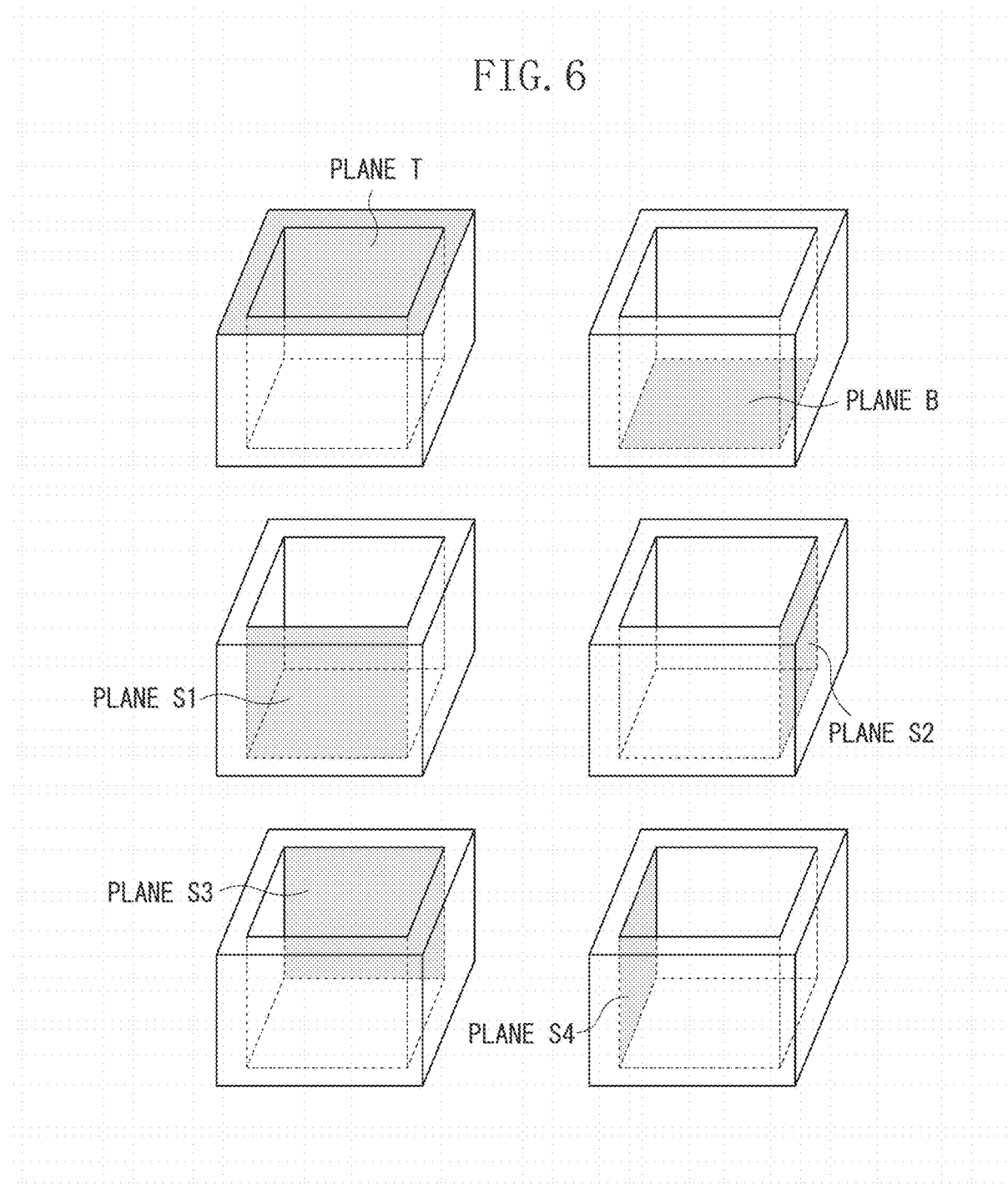
FIG. 6 is a diagram illustrating a plane of a pallet used in the interference determination.

The pallet 205 to be used in the interference determination is defined by a top face of a plane T, four side faces of planes S1, S2, S3, and S4, and a bottom face of a plane B arranged inside thereof as illustrated in FIG. 6. Herein, interference is first described with reference to a flowchart of FIG. 7.

In step S701, the interference determination unit 104 creates polygons representing the measurement target object 201.

In step S702, the interference determination unit 104 extracts a polygon between the plane T corresponding to the top face and the plane B corresponding to the bottom of the pallet 205 from the polygons created in step S701.

The polygon includes a position of a point (three-dimensional coordinates) on a surface of the measurement target object 201, and connection information of each point forming a polygon that approximates a surface. A polygon is generally formed in a triangle shape. However, a rectangle shape or a pentagon shape may be used. Any polygon model may be used as long as object shape can be expressed in approximation by the three-dimensional coordinates of the surface points and the connection information thereof.

As for each polygon, an equation of a plane and three-dimensional coordinates of each point forming the polygon are used to determine a plane on which the polygon is provided. The polygon is expressed by a sequence of points (typically, three points of a triangle). Thus, based on each point and the determination of whether the left side of the equation of the plane of $ax+by+cz+d=0$ (constraint of $a^2+b^2+c^2=1$) is positive or negative, it is possible to determine a plane on which the polygon is provided. If the left side of the equation is positive or negative depending on each point forming the polygon, the polygon is positively interfering the plane.

In step S703, the interference determination unit 104 next checks a positional relationship between the planes S1 through S4 serving as side faces and the polygon extracted in step S702. The interference determination unit 104 checks whether each polygon is positioned inside the pallet 205 with the planes S1 through S4. The interference determination unit 104 excludes the polygon determined to be inside the pallet 205, and pays attention to the remaining polygons. If there is no remaining polygon (NO in step S704), then in step S705, the interference determination unit 104 determines that the palette 205 does not interfere with the measurement target object 201. Accordingly, in step S706, the interference determination unit 104 determines that the measurement target object 201 is a gripping candidate.

On the other hand, the interference determination unit 104 may determine that any one of the polygons is interfering with a plane or a certain polygon is outside the pallet 205. In such a case, in step S707, the interference determination unit 104 determines that such a measurement target object 201 interferes with the pallet 205. Accordingly, in step S708, such a measurement target object 201 is excluded from the gripping candidates.

In the interference determination process, a distance between a polygon and a plane usually includes a margin. In a case where physical interference actually occurs, objects contact each other. This may cause damage to the robot including the robot hand 206. Accordingly, if the distance is shorter than a certain distance, the interference determination unit 104 determines that interference has occurred in consideration of safety. This margin depends on error, estimation accuracy, or robot accuracy, and is set as a certain threshold value. Specifically, as illustrated in FIG. 8 instead of FIG. 5, the pallet 205 is modified to have a numerical value of a margin m, and an actual interference determination process is performed.

Since the whole model is used in the interference determination process, both of the models are used by the information processing apparatus 1 as a whole.

In the present exemplary embodiment, the partial model is generated from the whole model, and each of the partial model and the whole model is separately retained. For example, partial model data is generated by a method in which an external system such as a CAD system is used with respect to the information processing apparatus 1 to create partial model data by editing the whole model, and the whole model and the partial model are taken in and retained in the information processing apparatus 1.

Figure 10A:
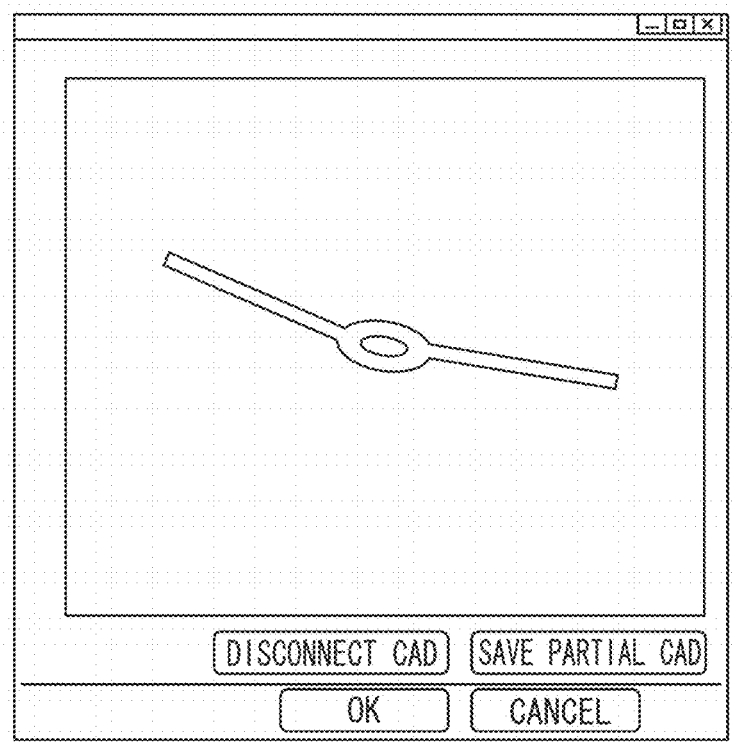
FIGS. 10A, 10B, 10C, 10D, and 10E are diagrams each illustrating a graphical user interface (GUI) used to create a partial model.
Figure 10B:
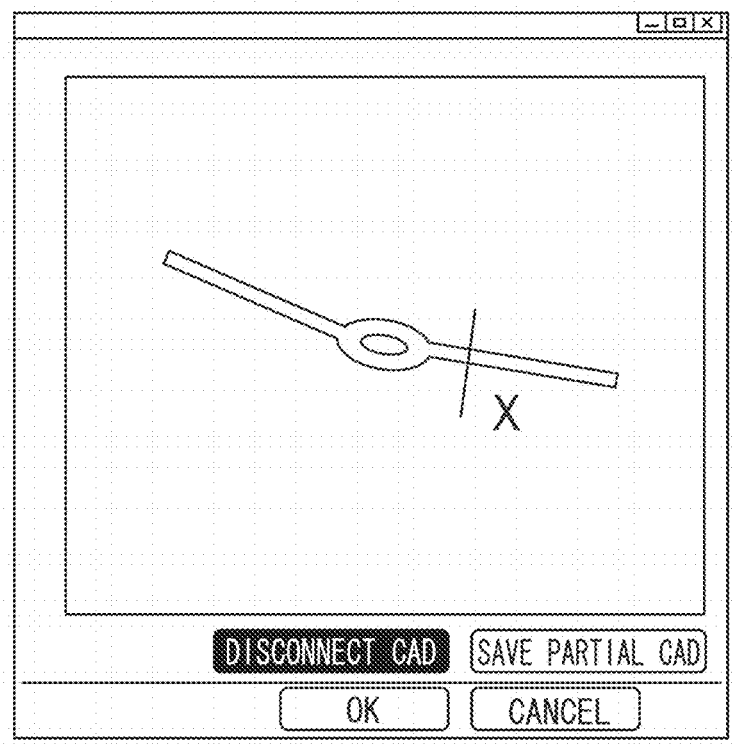
Figure 10C:
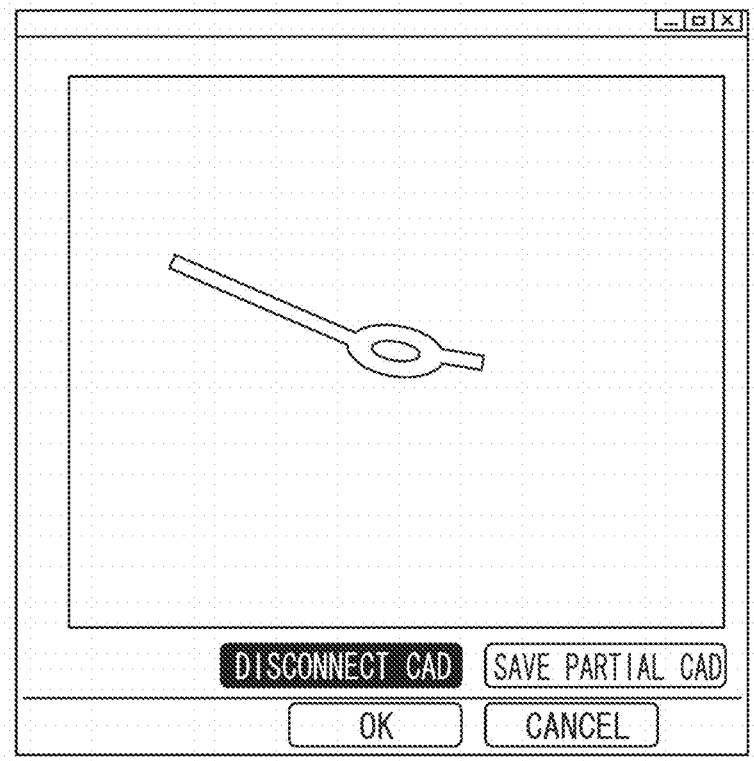
Figure 10D:
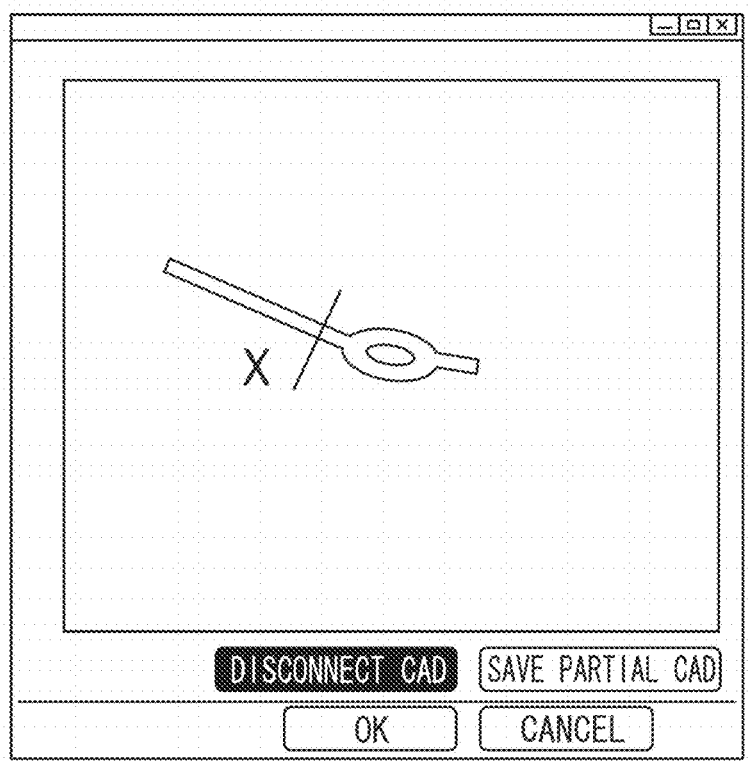
Figure 10E:
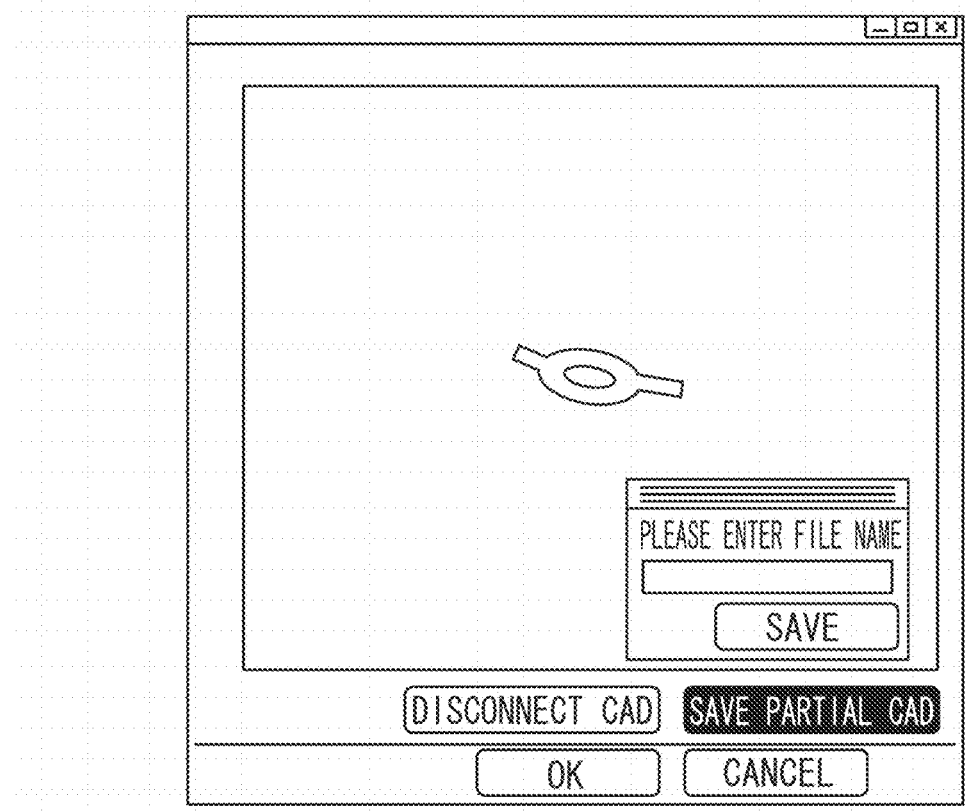

Moreover, there is a method for creating the partial model in the information processing apparatus 1. According to the method, the information processing apparatus 1 uses a graphical user interface (GUI) to read the whole model, and cuts one part of the whole model on a plane to create the partial model. In such a case, the partial model is created using a screen as illustrated in FIG. 10A. The screen includes a display region in a middle portion thereof. The display region can three-dimensionally display a CAD model. When the display region where the CAD model is displayed on the screen is clicked and dragged, a three-dimensional viewpoint from which the CAD model is viewed can be changed. Moreover, the use of a wheel of a mouse enables the CAD model on the screen to be enlarged and reduced. The terms "enlargement" and "reduction" used herein respectively correspond to an operation in which a three-dimensional viewpoint is brought closer to the measurement target object 201, and an operation in which a three-dimensional viewpoint is brought farther from the measurement target object 201. When a display of the three-dimensional CAD model from an arbitrary viewpoint is shifted to that from an appropriate viewpoint, a CAD disconnection button is pressed, and two points are designated as illustrated in FIG. 10B. Accordingly, a line connecting the two points appears on the screen. This practically represents a plane perpendicular to the screen. After the line is displayed, a mouse cursor changes to ×. Thus, a CAD model to be deleted is clicked among CAD models divided on the plane. Such an operation is performed one time, so that the CAD model is cut on a certain plane and one of the cut CAD models is deleted (FIG. 10C). Such an operation is repeated as illustrated in FIG. 10D, so that the partial model the unnecessary portion of which is deleted can be created (FIG. 10E). At this stage, the use of a save button enables the partial model to be stored with a name. The created partial model and the whole model are retained inside the apparatus.

In the present exemplary embodiment, a CAD model for a recognition process and a CAD model for an interference determination process are separately retained in a storage unit inside the apparatus. Therefore, even if the partial model is used in the recognition process, the use of the whole model can be used in the interference determination process, so that the interference determination can be correctly performed.

Hereinafter, a second exemplary embodiment of the present invention is described. In the first exemplary embodiment, two models, i.e., a model for a recognition process and a model for an interference determination process, are separately retained, and the recognition process is performed using the partial model created by clipping from the whole model.

In a recognition process using the partial model, the partial model may be simply used in a conventional recognition process using the whole model. In such a case, a pseudo boundary appears on a cutting surface. This may cause a pseudo model surface point and a pseudo model edge point, and the recognition process may be adversely affected. In the present exemplary embodiment, a method for removing a pseudo surface or edge caused by the cutting surface to reduce such an adverse effect is described.

First, a model surface point and a model edge point are described.

The model surface point represents a sample point for associating a model with a distance point to shorten a processing time. A sample point for alignment is prepared beforehand as a measurement model from polygon models generated in advance. Then, the measurement model is projected on a range image of 2.5 D, so that the model and a distance point are associated with each other.

A method for generating model surface points from different viewpoints is as follows. When a model surface point generation model is observed from various angles, appearance of the measurement target object 201 changes markedly. Moreover, the measurement target objects 201 overlap one another. Accordingly, a method for determining whether a model surface point is visible by referring to an image of a rendered model is used.

Similar to the model surface point, when a model is observed at an observation orientation in each node of a model generated from each viewpoint, a visible model edge point is added to an edge list in the node of each viewpoint. There are three types of model edge points, i.e., a boundary representation (BREP) edge, a Mesh edge, and a structure edge. The BREP edge serves as an accurate edge generated by dividing a boundary curved surface of each surface of a CAD model. The Mesh edge including a tessellation error is generated by dividing each side of a polygon surface. The structure edge is generated by dividing each side of a polygon surface with respect to a jumping edge portion of an internal structure.

A method for removing a pseudo surface or edge caused by a cutting surface is performed such that a model point on the cutting plane is not used as illustrated in FIG. 11, the model point being to be used for model fitting. FIG. 12 is a flowchart illustrating such a method.

In step S1601, a model is retained in a shape in which one portion of a CAD model is cut by a plurality of planes for partial recognition, and such cutting planes are also retained in an internal data structure.

In step S1602, a model point is selected.

In step S1603, a distance between the model point selected in step S1602 and the cutting surface is calculated.

In step S1604, it is determined whether the distance calculated in step S1603 is within a threshold value. If the distance is within the threshold value (YES in step S1604), the model point is determined to be on the cutting plane. Then, the operation proceeds to step S1605. On the other hand, if the distance is greater than the threshold value (NO in step S1604), the operation proceeds to step S1606.

In step S1605, the model point on the cutting plane, i.e., a model surface point and a model edge, is set not to be used.

In step S1606, the model point, that is, a model surface point and a model edge, is set to be used.

Alternatively, the whole model and the partial model may be compared to exclude a model point on the partial model that cannot be observed in the whole model among model points, instead of retaining the cutting plane as illustrated in FIG. 12.

Figure 14:
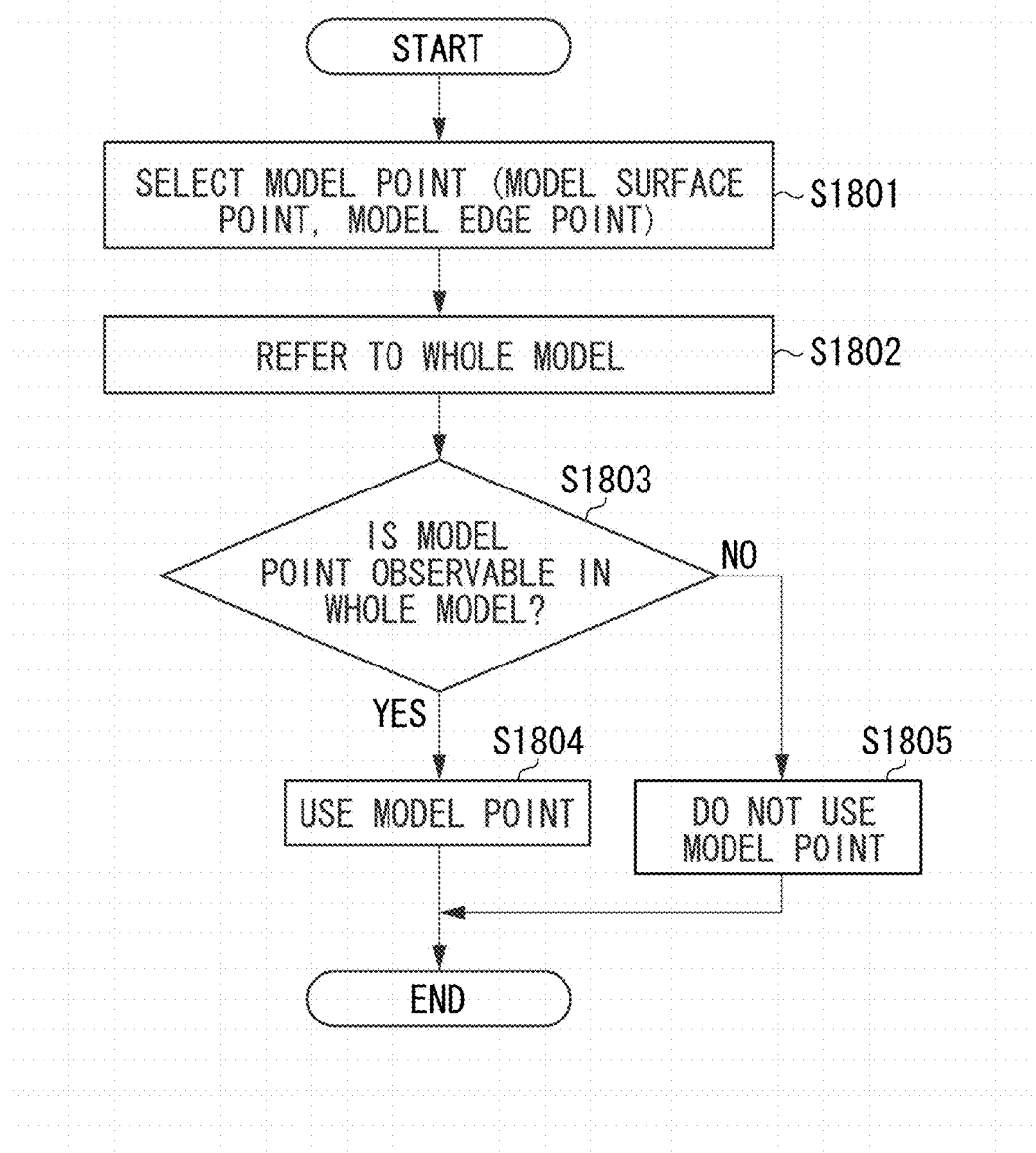
FIG. 14 is a flowchart illustrating a procedure performed when the whole model and the partial model are compared to exclude the model point according to the second exemplary embodiment.

FIG. 13 is a diagram illustrating a case where a whole model and a partial model are compared to exclude a model point that is not to be used according to the second exemplary embodiment. FIG. 14 is a flowchart illustrating processing performed when the method illustrated in FIG. 13 is executed. In the flowchart of FIG. 14, only steps different from those in the flowchart of FIG. 12 are described. In step S1802, the whole model is referred. In step S1803, it is determined whether the model point selected in step S1801 is observable in the whole model. If the model point is observable (YES in step S1803), then in step S1804, the model point is used. If the model point is not observable (NO in step S1803), then in step S1805, the model point is not used. Therefore, the whole model is referred with respect to the model point selected on the partial-model-based model, instead of retaining cutting surface information in the partial model.

Hereinafter, a third exemplary embodiment of the present invention is described. The first exemplary embodiment has been described using an example of an overall configuration of a position and orientation measurement apparatus in which two models, i.e., a model for a recognition process and a model for an interference determination process, are separately retained.

In the present exemplary embodiment, the purpose of using the partial model is further described. Moreover, the present exemplary embodiment is described using an example case in which a different model is used depending on the approximate position and orientation recognition unit 102 or the position and orientation calculation unit 103 in a recognition process. Specifically, three models including two models for a recognition process and one model for an interference determination process are used.

In a case where the partial model is used to recognize the measurement target object 201, the following two cases can exist as described above in the first exemplary embodiment. It is considered that the use of the partial model enables recognition of a large measurement target object 201 that extends outside an image capturing visual field. A specific part can be recognized using only a CAD model indicating a certain part within the visual field range, thereby recognizing the large measurement target object 201. Moreover, a part where the possibility of occurrence of measurement errors is low can be identified to intentionally limit a measurement range. This enables a position and an orientation to be calculated with good accuracy using the partial model.

Figure 15A:
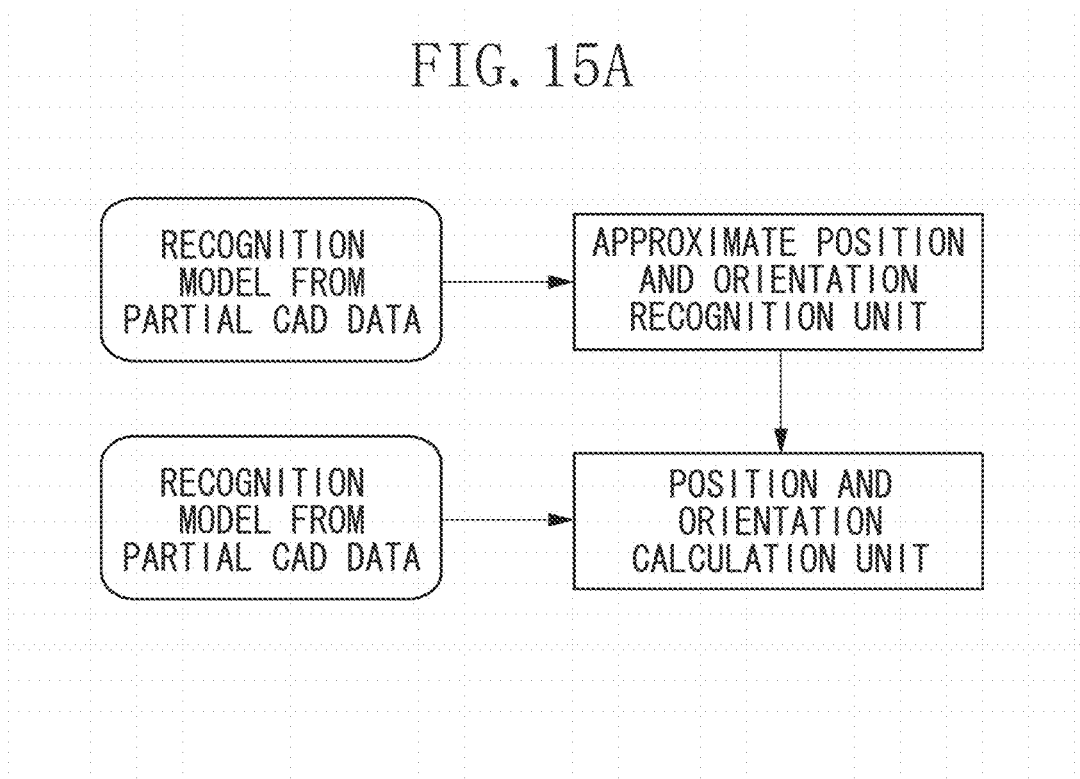
FIG. 15A is a diagram illustrating a case where a partial model is used by both of an approximate position and orientation recognition unit and a position and orientation calculation unit.
Figure 15B:
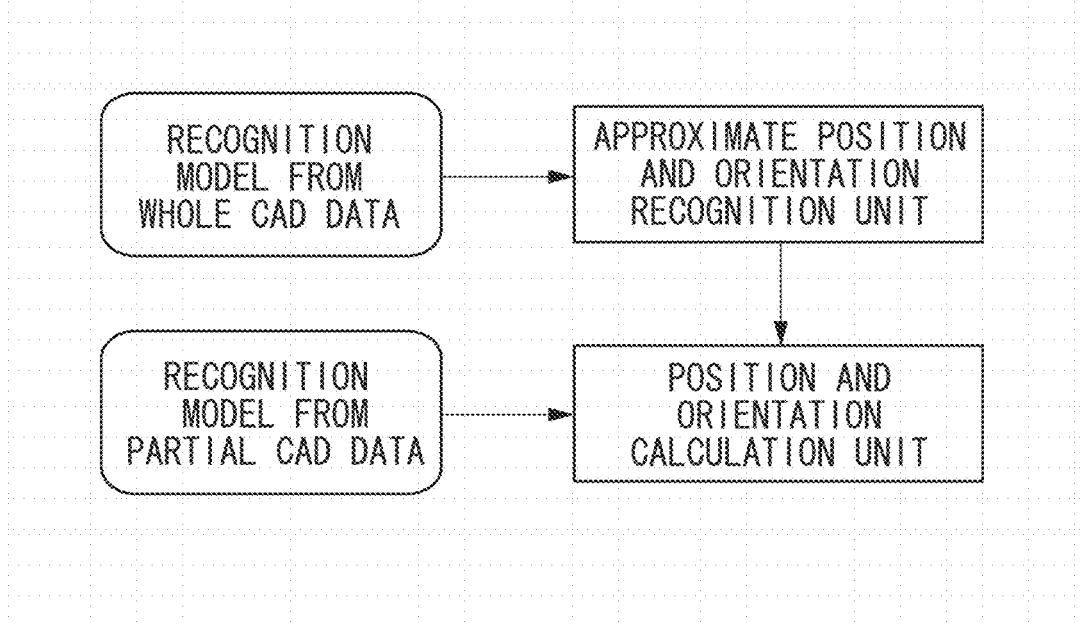
FIG. 15B is a diagram illustrating a case where a whole model and a partial model are respectively used by the approximate position and orientation recognition unit and the position and orientation calculation unit according to a fourth exemplary embodiment of the present invention.

The approximate position and orientation recognition unit 102 and the position and orientation calculation unit 103 can be considered separately. In such a case, the partial model can be used in two cases as illustrated in FIGS. 15A and 15B. In FIG. 15A, both of the approximate position and orientation recognition unit 102 and the position and orientation calculation unit 103 use the partial models to perform processes. In FIG. 15B, the whole model and the partial model are respectively used at an earlier stage and a later stage. The example case illustrated in FIG. 15A is typically applied when the measurement target object 201 as a whole corresponding to the whole model is too large to be inside the image capturing visual field. Meanwhile, the example case illustrated in FIG. 15B can be mainly applied when only a specific part is used to accurately perform fitting at a final stage. An approximate position and an approximate orientation can be determined by roughly determining a position and an orientation using a CAD model of the measurement target object 201 as a whole, and then the partial model can be eventually used to precisely perform fitting on a specific part.

Although both of the approximate position and orientation recognition unit 102 and the position and orientation calculation unit 103 can use partial models, the partial models are not necessarily the same. The approximate position and orientation recognition unit 102 and the position and orientation calculation unit 103 can use partial models each indicating a different part (one partial model may include the other partial model). Therefore, even if the large measurement target object 201 extending outside the image capturing visual field is to be recognized, a part where the possibility of occurrence of measurement errors is low is identified so as to be used in position and orientation calculation at a final stage. This enables the position and the orientation to be calculated with good accuracy.

Hereinafter, a fourth exemplary embodiment of the present invention is described. The first exemplary embodiment has been described using an example case in which a certain margin is arranged at the time of interference determination. In the present exemplary embodiment, an interference check margin m is dynamically set for each measurement target object 201.

In a case where a recognition model derived from the partial model is used, it is expected that a position and an orientation of the specific part can be determined with high accuracy. However, in a case where the measurement target object 201 as a whole is concerned, determination accuracy of an orientation may be degraded. Thus, a degree of such degradation is determined beforehand, and interference determination is performed in consideration of such ambiguities.

Fitting using the partial model of a specific part may be repeatedly performed beforehand to measure variations in the orientation, so that variation in orientations can be used. An error in accuracy of one pixel may occur in fitting using the partial model of a specific part. The number of pixels of the variation is set to P. The number of pixels may be a decimal fraction in consideration of sub-sampling accuracy.

Figure 16:
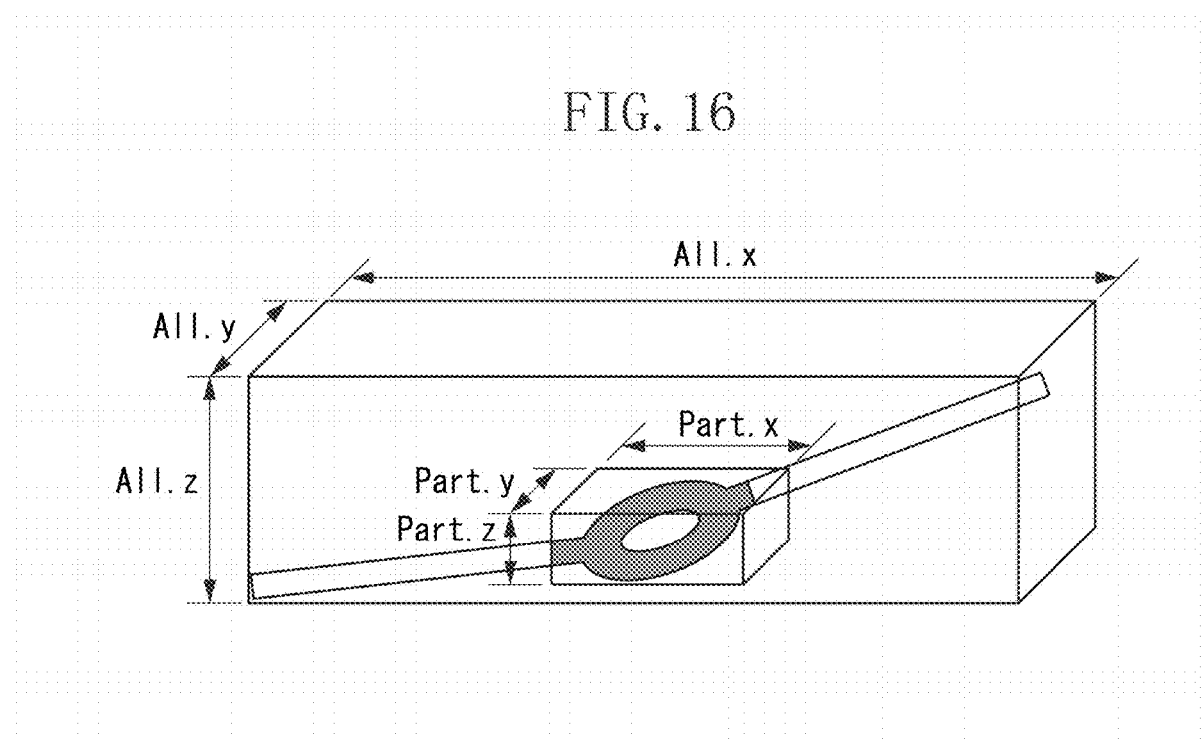
FIG. 16 is a diagram illustrating a size of a specific part of a measurement target object and a whole size of the measurement target object in the fourth exemplary embodiment.

As illustrated in FIG. 16, assume that sizes of a specific part of the measurement target object 201 on respective axes are Part.x, Part.y, and Part.z, and sizes of the measurement target object 201 as a whole on respective axes are All.x, All.y, and All.z. Herein, a maximum value of a size ratio for each axis is calculated by the following equation.

$$M=\mathrm{MAX}(\mathrm{All}.x/\mathrm{Part}.x, \mathrm{All}.y/\mathrm{Part}.y, \mathrm{All}.z/\mathrm{Part}.z)$$

Then, in the equation, m'=m+P×M, m' is substituted for a margin m. The present exemplary embodiment is not limited to such an equation. As long as a margin can be determined in a manner that variation in orientations of a part of the measurement target object 201 can be reflected to variation in orientations of the measurement target object 201 as a whole, any equation may be used.

According to each exemplary embodiment of the disclosure of the description, even if a partial model is used to acquire a position and an orientation of an object, interference between the object and a pallet can be correctly determined.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-061687, filed Mar. 24, 2015, which is hereby incorporated by reference herein in its entirety.

What is claimed is:

1. An information processing apparatus comprising:
one or more processors; and
one or more memory devices, the one or more memory devices storing a partial model representing a shape of a part of a whole shape of a target object and a whole model representing the whole shape of the target object, the one or more memory devices storing executable instructions, which when executed by the one or more processors, cause the information processing apparatus to:
derive an approximate position and an approximate orientation of the target object and derive a position and an orientation each having higher accuracy using the approximate position and the approximate orientation, based on measured three-dimensional information of a target object stored in a container and the partial model and the whole model of the target object stored in the one or more memory devices; and
based on the derived position and the orientation and the whole model of the target object stored in the one or more memory devices, determine whether the target object and the container will come into contact with each other when a robot hand moves the target object.

2. The information processing apparatus according to claim 1, wherein the instructions when executed by the one or more processors cause the information processing apparatus to, based on the approximate position and the approximate orientation, associate a model point extracted from the partial model with a measurement point included in the measured three-dimensional information, and derive the position and the orientation by updating the approximate position and the approximate orientation such that a difference between the associated model point and the measurement point is reduced.

3. The information processing apparatus according to claim 2,
wherein the partial model is generated by clipping one part from the whole model, and
wherein the position and the orientation are derived without using a model point on a clipped surface generated when the partial model is generated from the whole model, the model point being among model points of the partial model.

4. The information processing apparatus according to claim 1, wherein the approximate position and approximate orientation are derived using one among the whole model and the partial model and the position and orientation are derived using the other among the whole model and the partial model.

5. The information processing apparatus according to claim 4, wherein the approximate position and approximate orientation are derived using the whole model, and the position and orientation are derived using the partial model.

6. The information processing apparatus according to claim 1, wherein the one or more processors further cause the information processing apparatus to control the robot hand.

7. The information processing apparatus according to claim 1, wherein a length of the target object in a predetermined axis direction is greater than that of the container in a predetermined axis direction.

8. The information processing apparatus according to claim 1, wherein the three-dimensional information is acquired from a captured image of the target object, and
wherein the captured image does not include a whole of the target object.

9. The information processing apparatus according to claim 8, wherein the instructions when executed by the one or more processors cause the information processing apparatus to, if a distance between the whole model arranged in the position and the orientation of the target object and the model representing a container shape arranged in a position of the container is smaller than a threshold value, determine that the target object and the container will come into contact with each other.

10. The information processing apparatus according to claim 9, wherein the threshold value is determined for each part of the whole model.

11. The information processing apparatus according to claim 1, wherein the instructions when executed by the one or more processors cause the information processing apparatus to determine whether the whole model arranged in the position and the orientation of the target object and a model representing a container shape arranged in a position of the container will come into contact with each other.

12. An information processing method comprising:
deriving an approximate position and an approximate orientation of a target object and deriving a position and an orientation each having higher accuracy using the approximate position and the approximate orientation, based on measured three-dimensional information of a target object stored in a container and a partial model and a whole model of the target object; and
determining, based on the derived position and the orientation and the whole model of the target object, whether the target object and the container will come into contact with each other when a robot hand moves the target object,
wherein the partial model represents a shape of a part of a whole shape of the target object, and
wherein the whole model represents the whole shape of the target object.

13. A non-transitory computer-readable storage medium storing instructions that, when executed by a computer of an information processing apparatus, cause the computer to perform a method comprising:
deriving an approximate position and an approximate orientation of a target object and deriving a position and an orientation each having higher accuracy using the approximate position and the approximate orientation, based on measured three-dimensional information of a target object stored in a container and a partial model and a whole model of the target object; and
determining, based on the derived position and the orientation and the whole model of the target object, whether the target object and the container will come into contact with each other when a robot hand moves the target object,
wherein the partial model represents a shape of a part of a whole shape of the target object, and
wherein the whole model represents the whole shape of the target object.

* * * * *